Aug. 20, 1968  J. S. DONOVAN  3,397,594
HYDRO-MECHANICAL TRANSMISSION
Filed Nov. 14, 1966
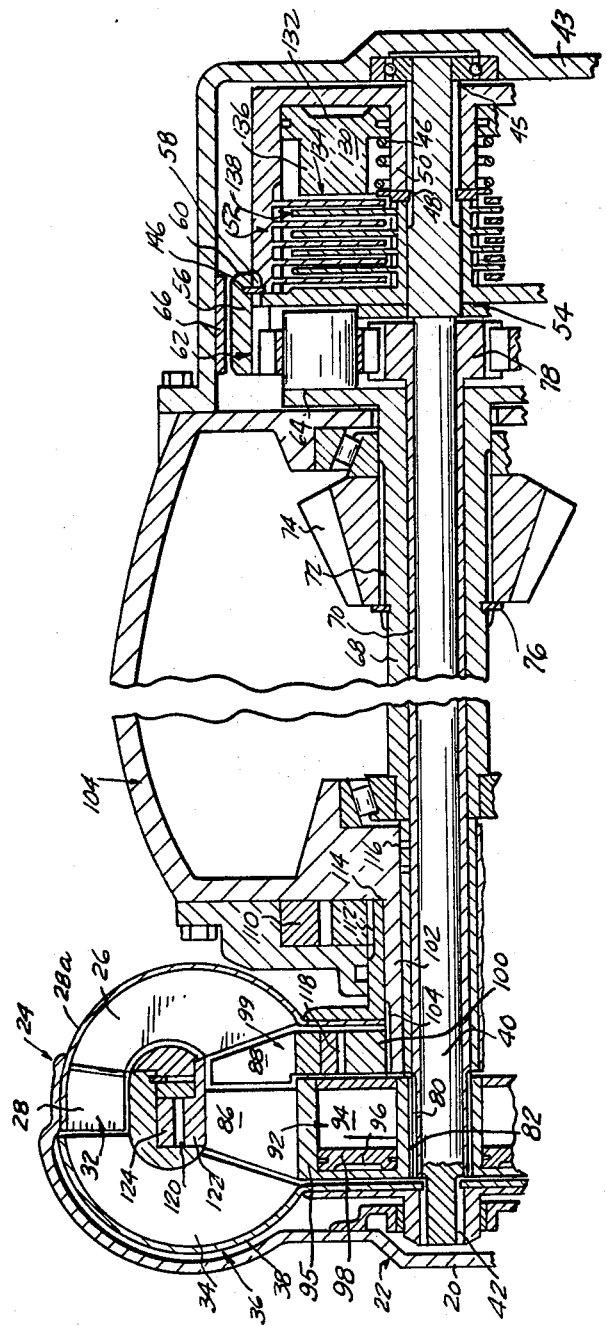
INVENTOR
JOHN S. DONOVAN
BY  David A. Mason
ATTORNEYS 3,397,594
Patented Aug. 20, 1968

3,397,594
HYDRO-MECHANICAL TRANSMISSION
John S. Donovan, Detroit, Mich.
(109 Queen St., Barrie, Ontario, Canada)
Continuation-in-part of application Ser. No. 438,549,
Mar. 10, 1965. This application Nov. 14, 1966, Ser.
No. 594,219
2 Claims. (Cl. 74—677)

ABSTRACT OF THE DISCLOSURE

This invention relates generally to a hydro-mechanical transmission. It provides for planetary gears, a primary driven turbine, and a secondary driven turbine. Power output is taken from a pinion gear interposed between the turbines and the planetary transmission. A selectively actuated clutch is provided between a shaft driven by a turbine and the ring gear of the transmission. A brake band can be selectively actuated to hold the ring gear to the housing of the transmission. Rate of drive reduction can be selected by varying the angle of the attack on vanes on a turbine. This variation is achieved by a curved arm linked to a vane and moved by a hydraulically actuated piston.

---

This invention relates to a transmission for use in automotive vehicles, machinery and the like which employs a torque converter and a planetary gear arrangement along with clutches, a brake band, and associated hydraulic and mechanical elements to provide reverse, neutral and retard conditions and a forward drive range wherein the rotational velocity of the output shaft may be controlled to any speed equal to or less than that of the input shaft.

The present application is a continuation-in-part of my copending patent application designated Ser. No. 438,549 now abandoned filed on Mar. 10, 1965, entitled, Hydro-Mechanical Transmission.

The transmission of the present invention falls into that class wherein the input shaft is connected to the driving turbine or pump of a fluid coupling and torque converter, and both primary and secondary driven turbines are powered by the driving turbine and provide the output through a planetary gear assembly. In a preferred embodiment of this invention, the primary turbine can be rotatably connected to the ring gear of the planetary gear assembly by engagement of a clutch. The secondary driven turbine is directly rotatably connected to the sun gear of the planetary gear assembly. The ouput of the transmission is taken from the rotation of the planetary gear axle carrier. The speed and direction of the output of this transmission is dependent upon both the relative direction and speeds of the primary and secondary driven turbines.

In the operation of the preferred embodiment of this invention, there are provided the functions of drive (rotation of the output of the transmission in the same direction and substantially the same speed as the direction and speed of the rotation of the drivng turbine), reduction (the direction of the ouput is the same as the direction of rotation of the driving turbine, but the speed is less) and reverse (the direction of output is opposite to the direction of rotation of the driving turbine). These functions are accomplished with the clutch engaging the rotation of the primary driven turbine with the ring gear of the planetary gear assembly, and the brake band is disengaged from contact with the ring gear. Differentiation between the function of drive, reduction, and reverse are in part obtained by varying the angle of vanes in the secondary turbine with respect to vanes in the primary driven turbine. When a high angle of incidence is present, a drive range is achieved. When the angle of attack is lessened, reduction is achieved. If the angle of attack of the secondary driven turbine vanes, is smaller than a predetermined critical value, a reversal of direction is achieved and the transmission performs a reverse function, when the brake band freezes the ring gear.

In addition to the functions of drive, reduction and reverse, a retard function is provided by the practice of this invention. This function is achieved by engaging the brake band with the ring gear of the planetary gear assembly so as to hold the ring gear static with respect to the transmission housing. Simultaneously the clutch otherwise engaging the rotation of the primary driven turbine with the ring gear is disengaged, allowing the primary driven turbine to rotate free of contact with the ring gear. When the vanes of the secondary driven turbine are held flush with respect to the vanes of the primary driven turbine, an increase in speed applied to the rotation of the secondary shaft will cause the driving turbine to speed up. The extent of the retard function is controlled by movable vanes on the driving turbines in a manner disclosed in my aforementioned copending application.

It is an object of this invention to provide a transmission for automotive or similar application where a torque converter is combined with the planetary gear transmission in a simple and economic fashion to provide a wide range of reduction together with functions of direct drive, reverse and retard in transmitting power from an engine to an output shaft.

It is a further object of this invention to provide a torque converter and planetary gear combination in a transmission wherein variable drive can be obtained simply by changing the angle of attack of the vanes on a secondary driven turbine with respect to the vanes on a primary driven turbine.

It is a still further object of my invention to provide a transmission comprising the cooperation of a torque converter and a planetary gear assembly in which the output of the transmission can be obtained between the location of the torque converter and the planetary gear assembly, and extended to a differential located therebetween.

It is another object of this invention to provide a higher upper limit of counterrotation between a secondary driven turbine and a primary driven turbine in a reverse function of a transmission.

Other objects of this invention will appear in the following description and appended claims, referring to the accompanying drawings forming a part of the specification.

On the drawings

The figure is a transverse sectional view of a preferred embodiment of this invention.

Before explaining the present invention in detail it is to be understood that the invention is not limited in its application as to details of construction and arrangement of parts illustrated in the accompanying drawings since the invention is capable of other embodiments and of being practiced or carried out in various ways. Also, it is to be understood that the phraseology and terminology is for the purpose of description and not limitation.

As shown on the drawings

In the figure is shown a preferred embodiment of the present invention. A drive shaft of an engine, not shown, is directly fixedly mechanically attached to, and rotates with a front face 20 of a housing shown generally at 22 on an impeller or driving turbine. The driving turbine shown generally at 24 comprises the housing 22, and a plurality of fixed vanes 26. Each fixed vane 26 is arcuately shaped and fixedly attached to a portion 28a of the driving turbine housing; each of a plurality of movable vanes 28 is hinged and rotatable with respect to one of the fixed vanes 26.

In hydraulic communication with a combination 32 of a variable vane 28 and a fixed vane 26, is another arcuate blade or vane 34. This vane 34 is part of a driven turbine 36 referred to hereinafter as a primary driven turbine. A shell 38 enclosing the outer perimeter of the arcuate blade 34 directs hydraulic communication between the driven turbine 36 and other turbine members to be described hereinafter.

The driven turbine 36 has a portion that is mechanically attached to the movement of a primary shaft 40. This attachment is accomplished by means of splines 42 on the shaft 40 that engage notches (not shown) in the portion of the driven turbine 36. In the preferred embodiment of this invention it can be readily appreciated from the foregoing that the primary turbine is mechanically linked to the primary shaft. Thus, the rotation of the primary driven turbine is always the same as the rotation of the primary driven shaft both in direction and in speed.

The shaft 40 is journaled on a transmission housing 43 by means of a bearing 45. Near the output end 46 of the transmission, the primary driven shaft 40 has a splined portion 48. This splined portion is directly mechanically and rotatably engaged with a portion 50 of a clutch assembly 52 to be described hereinafter.

A radially, outwardly, extending disc-like, annular projection or flare 54 is provided on the drive shaft 40 abutting on a portion of the load thrust imposed on portions of the transmission. A ring gear concentric with and surrounding the shaft 40 has a splined portion 58 that engages with a portion of the clutch assembly 52. When the clutch portion of the clutch assembly 52 is positively engaged, the ring gear is mechanically and rotatably engaged with the rotation of the shaft 40.

The ring gear 60 engages a plurality of planetary gears 62 in the manner well known in the art of planetary transmissions. Each of the planetary gears 62 is journaled on a planetary gear axle carrier 64.

A brake band 66 concentric with and surrounding the ring gear 60 is provided for reverse and retard functions in cooperation with the ring gear to be described in further detail hereinafter.

The planetary gear axle carrier 64 is an integral part of a shaft member 68 extending to, concentric with, and surrounding a sun gear shaft. The sun gear shaft 70 is concentric with, and surrounds the primary driven shaft 40. The shaft 68 is utilized as the output shaft of the transmission in the preferred embodiment of this invention. It has a splined portion 72 that engages the pinion or final drive gear 74. A snap ring 76 is utilized to accomplish the purpose.

The planetary gears 62 drive the sun gear 78. The sun gear 78 is an integral part with the shaft 70 that extends along with, is coaxial with, and is between shafts 68 and 40.

Shaft 70 has a splined portion 80 near the forward end of the transmission. This mechanically directly and co-rotationally engages an inner hub portion 82 of a turbine assembly 95.

The turbine 95 acts as a secondary driven turbine in the practice of this invention. It has blades 86 that hydraulically communicate with the aforementioned driven blades 34 and static blades 88. This communication can be appreciated from further description below.

Each of the turbine blades 86 is hinged on an axle lying in a plane substantially perpendicular to the aforementioned shafts 40, 68 and 78.

The hub portion 82 of the secondary driven turbine 95 has an inner chamber 92. Within this chamber there is disposed a curved arm member or vane 94 fixedly attached to the shaft 90 so that rotation of vane 94 will cause congruent rotation of vane 86.

The rotation condition of vane 94 is controlled by means of hydraulic fluid pressure introduced into chamber 96. Such pressure will induce a piston 98 to press against the convex most portion of the curved vane.

The fixed vanes 88 are attached to an inner hub assembly 118. The hub assembly 118 is directly, mechanically, and co-rotatably attached to a shaft portion 102 by means of a splined portion 104 on the forwardmost portion of the shaft portion 102. The shaft portion 102 is part of the housing of the differential 104. The purpose of splining the direct mechanical attachment of the static turbine 118 to the differential housing is to provide uncomplicated assembly and disassembly.

An eccentric oil pump 110 is provided as a source of hydraulic flow and pressure in the hydraulic portions of the embodiment herein discussed. It is directly, mechanically and co-rotatably attached to the driving turbine housing 24 by means of a splined portion 112 on a shaft portion 114 surrounding and coaxial with shaft and shaft portions 40, 68, 70, and 102.

Oil is communicated from the source pump 110 to other portions of the hydraulic system herein described by means of passage through sealed oil conduits 116 or other appropriate means suitable to hydraulic systems.

An overrunning clutch is provided between the hub of the static stator 100 and the vanes 88 and the stator portion 99. The purpose of this overrunning clutch is to prevent rotation of the blades of the stator confluent with the rotation of the blades 36 and 86 of the driven turbines when the speed of such rotation is less than the speed of rotation of the blades or vanes 26 or the driving turbine 24.

The overrunning brake allows the vanes 88 of the rotor to free wheel with the vanes 86 and 34 of the driven turbines when the speed of the secondary driven turbine has caught up with the speed of the primary driven turbine.

Before the speed of the secondary turbine equals that of the primary driven turbine, the stator 99 may be held static with respect to the rotation of the secondary driven turbine. In other words, that stator will act (1) as if it were attached to the trasnmission housing 104 while the secondary driven turbine counterrotates, or (2) the stator could be rotating at a slower speed than the primary driven turbine.

An underrunning clutch 120 is provided between the outer housing of the secondary driven turbine and the inner housing of the primary driven turbine. The purpose of this underrunning clutch is to prevent the speed of the secondary turbine from exceeding the speed of the primary driven turbine.

In the retard function of the apparatus to be discussed below, the underrunning clutch 120 also carries the load from the secondary driven turbine to the primary driven turbine.

The clutch assembly 52 comprises a hydraulic piston 130 that has a forward chamber 132 into which oil is introduced in order to drive the piston in a rearward direction of arrow 134. The head portion 136 of the piston 130 contacts the forwardmost portions of a plurality of disc clutches 138. These discs alternately attach to outer drum portion 50 and inner drum portion 60 referred to above. A snap ring 146 provides mechanical attachment between the ring gear 56 and the inner drum 60. When the piston is pressed rearwardly in the direction of arrow 134, the discs compress together and convey motion from the shaft 40 to the ring gear 56. Referring again to the detail of the clutch 52 a spring 146 urges the piston 130 opposite to the direction of arrow 134; that is toward deactivation of the clutch.

Operation

When the clutch 52 is engaged, and the engine is driving turbine 24, and the vanes 86 of the secondary turbine are at an angle of high pitch with respect to the attack of the vanes 34 of the primary driven turbine, the vanes 34 will be driven into rotation by flow imparted from the driving vanes 26. This will cause rotation of the secondary driven turbine vanes at the same speed as the vanes of the primary driven turbine. At this stage of operation, the rotation of the primary turbine will cause rotation of shaft 40.

Assuming the engine at this stage of operation is rotating in a clockwise direction, the driving turbine will rotate in a clockwise direction, and the primary and secondary turbines will be rotating in a clockwise direction. Thus the shaft 40 will be rotating in a clockwise direction. Because of the engaging of clutch 52, the ring gear 56 will also be rotating in a clockwise direction.

The sun gear will be rotating at the same speed as the secondary driven turbine. Thus the sun gear and the ring gear will be rotating in the same direction and at the same speed. Thus the planetary gears must of necessity remain stationary; that is, they do not rotate. However, this will also necessitate the rotation of the planetary gear axle carrier in the same direction as the sun and ring gears, namely in a clockwise direction. Thus all the rotatable elements of the above embodiment will be rotating in the same direction under the conditions specified above.

In order to achieve reduction that is distinguished from the immediately aforementioned example where there is direct drive without reduction, the pitch of the blades of the secondary turbine can be reduced with respect to the angle of the blades of the primary driven turbine. This is accomplished by introducing oil into the chamber 96 behind the piston 94 in order to move it in a forward direction to push the vane connected to axle 90 to reduce the angle of vane 86.

With this reduction in pitch, the rotation of the secondary driven turbine will necessarily be reduced in speed with respect to that of the primary driven turbine. This results because of the lesser resistance to hydraulic pressure and flow caused by the lesser angle of attack.

When the secondary driven turbine travels at a lesser rotational speed than the primary driven turbine, the sun gear is necessarily traveling at a lesser speed than that of the ring gear although both are rotating in the same direction. Clutch 52 is engaging the ring gear with the shaft 40 which in turn is directly linked to the shaft of the primary driven turbine. In this condition of operation, the relative rotation of the ringe gear and sun gear being different, the planetary gears are caused to rotate about their axles in the same direction to that of the direction of rotation of the sun gear. The planetary gear carrier will be rotating in the same direction as the ring gear. This condition is achieved when the reduction in pitch is not below a critical degree to be discussed hereinafter. When the latter situation occurs, the sun gear may be rotating in opposite direction to that of the ring gear. However, the planetary gears will be rotating in the same direction as the ring gear in that situation.

Continuing with the discussion of a slight reduction in pitch, the carrier will be rotating in a clockwise direction but at a lesser and reduced speed.

If the pitch of the vanes on the secondary turbine are sufficiently reduced, this will cause not only a reduction in the speed of the secondary turbine but actual counter-rotation to that of the primary driven turbine. These rotations are considered with respect to the transmission housing. This can be appreciated from the fact that provided the pitch of the vanes of the secondary turbine are reduced to some extent, there will always be resistance to the rotation of the primary driven turbine. The essential point is whether or not this reduction is sufficient to cause counter rotation with respect to a static member such as a transmission housing.

When the secondary driven turbine is counter rotating with respect to the transmission housing, the sun gear is also counter rotating. However, the ring gear and planetary gears, provided the clutch 52 is still engaged, will still be rotating with the primary driven turbine. The carrier will continue to rotate in the same direction as the ring gear but at a lesser speed. Even though the sun gear is reversed. This operation may be referred to as the lower extremity of reduction.

For reverse operation, the band 64 is engaged with the outer extremity of the ring gear 56. This holds the ring gear static with respect to the transmission housing. It will also, by virtue of engagement of the clutch 52, hold shaft 40 static with respect to the transmission housing. The angle of attack on the secondary turbine must also be decreased. This results in a flush passing condition of the vanes of the primary turbine to the other side sufficient to cause a mirror image of the angle of attack in the extreme gear reduction phase just discussed. Because shaft 40 is held static with respect to the transmission housing, so is the primary driven turbine. It acts essentially now as the static turbine blade or stator. But because the angle of attack has been reversed while still shallow, the driving turbine 24 will cause the secondary turbine blade to operate in a counterclockwise rotation. Thus, the sun gear is rotating in a counterclockwise rotation. The ring gear is static with respect to the transmission housing. The planetary gears are rotating in a clockwise direction. The carrier, however, will be rotating in a counterclockwise direction. Thus the output will be reversed.

For the retard operation of this invention in the above described embodiment, the clutch 52 is disengaged. However, the brake band 64 is engaged with the ring gear 56. The pitch of the secondary turbine blades will be flush with the blades of the primary driven turbine. In this phase of operation the differential will transmit motion to the carrier in a clockwise direction. This will cause the axles of the planetary gears to move with respect to the ring gear causing a counterclockwise motion on the planetary gears. This in turn will transmit a clockwise rotation to the sun gear. This motion will impel a clockwise rotation on the blades of the secondary driven turbine. The underrunning clutch will then cause the primary driven turbine to rotate in a clockwise direction. This will impel an increase in the speed of rotation of the impeller or formerly driving turbine. Thus the engine is speeded up. It acts as a "brake" on the speed of the differential.

What is claimed is:
1. In a transmission,
    a driving impeller;
    a primary driven turbine in hydraulic communication with said driving impeller;
    a secondary driven turbine in hydraulic communication with said primary driven turbine;
    a primary drive shaft mechanically linked to the rotation of said primary driven turbine;
    a secondary drive shaft mechanically linked to the rotation of said secondary driven turbine;
    a planetary gear assembly having a sun gear and a ring gear coaxially aligned with said sun gear, and a planetary gear axle carrier coaxially aligned with said sun gear, and planetary gears meshing with said ring gear and said sun gear;
    means actuable to drivingly connect said drive shafts with said planetary gear assembly;
    and means operable to change the angle of attack of the vanes in said secondary driven turbine with respect to the vanes in said primary driven turbine;
    said planetary gear assembly located at a distance from said driving impeller and said primary and secondary driven turbines whereby the drive output from said transmission varies in direction and speed responsive to the angle of attack of the vanes on said secondary driven turbine with respect to the vanes on said primary driven turbine;

and further comprising said first drive shaft being mechanically linkable with the rotation of said ring gear responsive to the actuation of a clutch simultaneously engaging said ring gear and said first drive shaft.

2. In a transmission, a driving impeller;

a primary driven turbine in hydraulic communication with said driving impeller;

a secondary driven turbine in hydraulic communication with said primary driven turbine;

a primary drive shaft mechanically linked to the rotation of said primary driven turbine;

a secondary drive shaft mechanically linked to the rotation of said secondary driven turbine;

a planetary gear assembly having a sun gear and a ring gear coaxially aligned with said sun gear, and a planetary gear axle carrier coaxially aligned with said sun gear, and planetary gears meshing with said ring gear and said sun gear;

means actuable to drivingly connect said drive shafts with said planetary gear assembly;

and means operable to change the angle of attack of the vanes in said secondary driven turbine with respect to the vanes in said primary driven turbine;

said planetary gear assembly located at a distance from said driving impeller and said primary and secondary driven turbines whereby the drive output from said transmission varies in direction and speed responsive to the angle of attack of the vanes on said secondary driven turbine with respect to the vanes on said primary driven turbine;

and further comprising said secondary shaft being mechanically linked directly to the rotation of the sun gear of said planetary gear apparatus.

References Cited

UNITED STATES PATENTS

| 2,291,120 | 7/1942  | Tipton        | 74—677 |
| 2,737,061 | 3/1956  | Kelley        | 74—677 |
| 2,957,370 | 10/1960 | Kelley et al. | 74—677 |
| 3,083,589 | 4/1963  | Knowles, et al. | 74—677 |
| 3,113,470 | 12/1963 | Knowles, et al. | 74—677 |
| 3,217,562 | 11/1965 | Stockton      | 74—677 |
| 3,242,677 | 3/1966  | Kelley        | 74—677 |

FRED C. MATTERN, JR., *Primary Examiner.*

ARTHUR T. McKEON, *Assistant Examiner.*